United States Patent

[11] 3,596,753

| [72] | Inventors | Heinrich Knapp;<br>Gerda Schanz; Regina Hansel, all of Bad<br>Blankenburg, Thuringian Forest,<br>Germany |
|---|---|---|
| [21] | Appl. No. | 749,342 |
| [22] | Filed | Aug. 1, 1968 |
| [45] | Patented | Aug. 3, 1971 |
| [73] | Assignee | VEB Transportgummi<br>Bad Blankenburg, Thuringian Forest,<br>Germany |

[54] HEAT-RESISTANT CONVEYOR BELT
4 Claims, No Drawings

[52] U.S. Cl. .................................................. 198/193,
156/137, 161/144, 74/237, 260/5, 260/23.7,
260/28.5, 260/31.8, 260/41.5, 260/890
[51] Int. Cl. ........................................................ F16g 1/12,
F16g 5/10
[50] Field of Search .......................................... 260/890;
198/193; 161/144, 217; 156/137

[56] References Cited

UNITED STATES PATENTS

| 2,893,466 | 7/1959 | Fink .............................. | 198/193 |
|---|---|---|---|
| 3,063,884 | 11/1962 | Glover et al. ................. | 198/193 |

FOREIGN PATENTS

| 736,998 | 9/1955 | Great Britain................ | 260/890 |
|---|---|---|---|
| 1,323,934 | 12/1963 | France ......................... | 161/217 |

OTHER REFERENCES

Murray et al., " The Neoprenes," Dupont Corp., March, 1963, pages 77— 82

*Primary Examiner*—Samuel H. Blech
*Attorney*—Nolte and Nolte

ABSTRACT: Heat-resistant conveyor belt consisting of an elastomer mixture with steel wire supporting inserts, the elastomer mixture consisting of nitrile rubber and polychloroprene with the nitrile rubber contents exceeding 50 percent; preferably an adhesive soluble in the elastomers is incorporated in the elastomer mixture.

HEAT-RESISTANT CONVEYOR BELT

The present invention relates to a conveyor belt comprising a heat-resistant rubber, i.e., elastomer, mixture with steel wire supporting inserts. Heat-resistant conveyor belts are necessary when hot goods are in contact with the belt, for instance in metallurgical plants and other plants, such as plants in which cement clinker materials have to be transported from a rotary kiln or a shaft furnace.

Conveyor belts of heat-resistant rubber mixtures are already known, but they have several shortcomings. Either they are provided with supporting inserts that are not heat resistant, e.g. inserts of polyamide fiber, polyester fiber or cellulose fiber; or the supporting inserts are not sufficiently strong, for instance where asbestos inserts are used.

Fiberglass has also been tried, but has not led to successful use. When attempts were made to use steel wire inserts in connection with heat-resistant rubber mixtures, they were a failure up to now, because there was no satisfactory adhesion between the mixture and the steel inserts and the connection of abutting ends was not heat resistant.

The phenylisocyanates used as agent for connecting abutting ends are not heat resistant since they become too weak at temperatures above 100° C.

Attempts were made to overcome the indicated shortcomings in conveyor belts consisting of heat-resistant rubber mixtures with steel wire inserts, by coating the steel wires with a thin-walled mixture of a substance enhancing adhesion of steel to rubber, before embedding them in the rubber mixture. However, such belts require more work for their preparation, which increases the production costs; moreover, due to the fact that the adhesive is not heat resistant, the belts as a whole will be less heat resistant.

It is an object of the present invention to provide a heat-resistant conveyor belt which is free of the shortcomings of the belts hitherto in use.

It is a further object of the invention to provide a conveyor belt having the required heat resistance for the transportation of goods of high temperature both in the rubber mixture and in the supporting inserts.

Other objects and advantages of the present invention will become apparent from the following detailed description.

For the purpose of the invention it is necessary to provide a rubber mixture which has the appropriate adhesiveness particularly to zinc-coated steel wires, and which is heat resistant, including the possibility of providing a heat-resistant connection at the abutting ends of the wires.

According to the invention the above objects can be realized by using as a rubber mixture a mixture of a nitrile rubber and a polychloroprene, the nitrile rubber component amounting to more than 50 percent by weight; in a preferred embodiment, the rubber mixture contains an adhesion-promoting agent which enhances the lasting contact with the steel wire inserts. One such agent are cobalt salts which are soluble in the elastomer, preferably complex cobalt salts.

In the following a general outline will be given how to made the heat-resistant conveyor belt with steel inserts according to the invention.

A mixture of the elastomers consisting of about equal parts of a nitrile rubber component and a polychloroprene component more specifically defined below, is prepared by mechanical action, for instance, mastication for further processing. After the compound has been softened by milling, the desired additives such as carbon black, zinc oxide, sulfur and other ingredients, for instance, fillers and softeners, are incorporated. The so prepared rubber mass is then run through calenders and formed into sheets. Into the so prepared rubber sheets, a length of steel wire is embedded by applying appropriate pressure thereon. For better adhesion to the rubber mass the steel wire has been previously coated by some such agent as a cobalt salt soluble in the elastomer.

Vulcanization is then carried out in a convenient manner.

One important feature is the provision of a lasting connection at the abutting ends of the wire inserts and the heat resistance of the joint. This is preferably brought about by coating the abutting ends with a rubber mixture containing resorcinol and hexamethylene tetramine which is capable of vulcanization.

In the following, the invention will be more fully described in an example but it should be understood that this is given by illustration and not by limitation, and that many changes in the details can be made without departing from the spirit of the invention.

Zinc-coated steel wires are embedded in a mixture of the following components. All parts are by weight.

EXAMPLE

| | |
|---|---|
| Butadieneacrylonitrile-copolymer | 500.0 parts |
| Polychloroprene | 500.0 parts |
| Acetylene lampblack | 200.0 parts |
| Kaolin | 225.0 parts |
| Zinc white | 37.5 parts |
| Ethylenethiourea | 1.0 parts |
| Tetramethylthiuramdisulfide | 12.0 parts |
| Dibutylphthalate | 50.0 parts |
| Burned magnesia | 30.0 parts |
| Ammoniumcobaltthiocyanate | 75.0 parts |

The Heat-resistant coat for the wires contains:

| | |
|---|---|
| Butadieneacrylonitrile-copolymer | 66.5 parts |
| Polychloroprene | 33.3 parts |
| Acetylene lampblack | 20.0 parts |
| Zinc white | 3.8 parts |
| Stearic acid | 0.5 parts |
| Ethylenethiourea | 0.1 parts |
| Tetramethylthiuramdisulfide | 1.3 parts |
| Wax for light protection | 3.0 parts |
| Phenylbetanaphthylamine | 3.0 parts |

The adhesive mixture for abutting ends contains:

| | |
|---|---|
| Natural rubber | 32.5 parts |
| Butadienestyrene rubber | 32.5 parts |
| Silica gel | 20.0 parts |
| Zinc white | 3.0 parts |
| Stearene acid | 1.2 parts |
| Dibutylphthalate | 3.7 parts |
| Hexamethylentetramine | 10.9 parts |
| Resorcinol | 8.1 parts |
| Sulfur | 2.0 parts |
| Tetramethylenethiuramdisulfide | 0.3 parts |
| 2-Dibenzothiazyldisulfide | 0.4 parts |

The conveyor belt according to the invention is superior to existing conveyor belts by a much higher heat resistance both in the rubber portion as well as in the connecting ends of the steel wires; furthermore, the adherence between the rubber and the inserts is very satisfactory.

It is a further advantage that the conveyor belt according to the invention can be manufactured at much lower costs.

It should be understood, of course, that the foregoing disclosure relates only to preferred embodiments of the invention and that it is intended to cover all changes and modification of the example described which do not constitute departures from the spirit and scope of the invention as set forth in the appended claims.

We claim:

1. A heat-resistant conveyor belt comprising an elastomer mixture having steel wire inserts embedded therein, said elastomer mixture consisting essentially of a nitrile rubber component and a polychloroprene component, wherein the nitrile rubber component is present in said elastomer mixture in an amount of at least 50 percent and containing ammoniumcobalt thiocyanate as agent for promoting adhesion of said elastomer mixture to said steel wire inserts.

2. A conveyor belt according to claim 1, wherein aid ammoniumcobalt thiocyanate is present in an amount of 4.5 wt. percent of said elastomer mixture.

3. A conveyor belt according to claim 1, wherein said nitrile rubber component is butadieneacrylonitrile.

4. A conveyor belt according to claim 1, wherein the abutting ends of the steel inserts forming an endless band have been pretreated before assembly with a mixture capable of vulcanization and consisting essentially of a first mixture consisting of about equal parts of natural rubber and butadienestyrene rubber and a second mixture consisting of about equal parts of resorcinol and hexamethylentetramine, said first rubber mixture amounting to about two-thirds of the entire mixture.